United States Patent
Keuchel et al.

(10) Patent No.: US 9,697,600 B2
(45) Date of Patent: Jul. 4, 2017

(54) MULTI-MODAL SEGMENTATIN OF IMAGE DATA

(71) Applicant: BRAINLAB AG, Feldkirchen (DE)

(72) Inventors: Jens Keuchel, Poing (DE); Daniel Modrow, Ottobrunn (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 14/901,289

(22) PCT Filed: Jul. 26, 2013

(86) PCT No.: PCT/EP2013/065790
§ 371 (c)(1),
(2) Date: Dec. 28, 2015

(87) PCT Pub. No.: WO2015/010745
PCT Pub. Date: Jan. 29, 2015

(65) Prior Publication Data
US 2016/0217567 A1    Jul. 28, 2016

(51) Int. Cl.
G06T 7/00 (2006.01)
G06K 9/62 (2006.01)

(52) U.S. Cl.
CPC ......... *G06T 7/0012* (2013.01); *G06K 9/6293* (2013.01); *G06T 7/004* (2013.01);
(Continued)

(58) Field of Classification Search
None
See application file for complete search history.

(56) References Cited

U.S. PATENT DOCUMENTS

2007/0081712 A1* 4/2007 Huang .................. G06T 7/0028
382/128
2007/0223815 A1 9/2007 Makram-Ebeid
(Continued)

OTHER PUBLICATIONS

High Resolution 3-D MR Image Reconstruction from Multiple Views. Mondal, Mukherjee, Sural and Bhattacharyya. Dec. 2012.*
(Continued)

*Primary Examiner* — Delomia L Gilliard
(74) *Attorney, Agent, or Firm* — Tucker Ellis LLP

(57) ABSTRACT

The invention relates to a medical data processing method of segmenting image features in medical images generated with different imaging modalities, wherein the image features represent a corresponding anatomical structure in each of the medical images, the method being constituted to be executed by a computer and comprising the following steps: a) acquiring (SI) first modality medical image data describing a first modality medical image containing a first modality image representation of the anatomical structure; b) acquiring (SI) second modality medical image data describing a second modality medical image containing a second modality image representation of the anatomical structure; c) determining, based on the first modality medical image data and the second modality medical image data, modality transformation data describing a mapping transformation between the image information in the first modality image data and the image information in the second modality image data; d) acquiring color value data describing a color value of the image elements in the first modality medical image and in the second modality medical image; e) determining (S2-S7), based on the first modality medical image data, first modality segmentation data describing the result of segmenting the first modality image representation from the first modality medical image data; f) determining (S8-S10), based on the first modality segmentation data and the modality transformation data and the color value data, second modality segmentation data describing a result of segmenting the second modality image representation from the second modality medical image data.

12 Claims, 3 Drawing Sheets

(52) U.S. Cl.
CPC .......... *G06T 7/0081* (2013.01); *G06T 7/0097* (2013.01); *G06K 2209/05* (2013.01); *G06T 2207/10081* (2013.01); *G06T 2207/10084* (2013.01); *G06T 2207/10088* (2013.01); *G06T 2207/10104* (2013.01); *G06T 2207/10116* (2013.01); *G06T 2207/10132* (2013.01); *G06T 2207/10136* (2013.01); *G06T 2207/20104* (2013.01); *G06T 2207/30008* (2013.01); *G06T 2207/30061* (2013.01); *G06T 2207/30096* (2013.01); *G06T 2207/30196* (2013.01)

(56) References Cited

U.S. PATENT DOCUMENTS

| | | | |
|---|---|---|---|
| 2008/0123918 A1* | 5/2008 | Saotome | G06T 5/009 382/128 |
| 2011/0268330 A1 | 11/2011 | Piper | |
| 2011/0271215 A1 | 11/2011 | Piper | |
| 2012/0057769 A1 | 3/2012 | Hibbard et al. | |
| 2012/0230568 A1* | 9/2012 | Grbic | G06K 9/6289 382/131 |
| 2014/0029812 A1* | 1/2014 | Kriston | G06T 7/0028 382/128 |
| 2015/0227702 A1* | 8/2015 | Krishna | G06F 19/321 705/2 |
| 2016/0098833 A1* | 4/2016 | Tsadok | G06K 9/6201 382/103 |

OTHER PUBLICATIONS

PCT/EP2013/065790—International Search Report mailed Apr. 7, 2014.

Prasenjit Mondal, et al.; High Resolution 3-D MR Image Reconstruction from Multiple Views; computer Vision, Graphics and Image Processing, ACM, 2 ZPenn Plaza, Suite 701 New York, NY 10121-0701; Dec. 16, 2012, pp. 1-8; XP058030159.

* cited by examiner

MULTI-MODAL SEGMENTATIN OF IMAGE DATA

RELATED APPLICATION DATA

This application is a national phase application of International Application No. PCT/EP2013/065790 filed Jul. 26, 2013, published in the English language.

The present invention relates to a method of segmenting image features in medical images generated with different imaging modalities, a computer program representing the method, a storage medium storing the program, a computer executing the program and a signal wave carrying information representing the program.

In medical applications, it is often desirable to determine the position of a representation of a specific anatomical structure in a medical image such as a computed tomography image. It is an inherent feature of specific imaging modalities, though, that not all imaging modalities are equally able to image a specific anatomical structure with such a precision, so as to allow segmentation of image features representing that anatomical structure from a resulting medical image. It may nevertheless be desired to determine the position of that anatomical structure in a medical image which was generated with an imaging modality which is not suitable to image the anatomical structure. For example, an x-ray image of soft tissue may not suffice to allow segmentation of that soft tissue from the x-ray image. A known approach is to segment the anatomical structure from a medical image which was generated with a different imaging modality, in the present example concerning soft tissue for example by application of a magnetic resonance imaging modality. The position of the anatomical structure segmented from the magnetic resonance image may then be determined in the x-ray image by mere comparison of positions in both images. This may, however, lead to a loss of information since also the magnetic resonance image may not contain an ideal representation of the anatomical structure and information about features of the anatomical structure which may be visible only in the x-ray image is lost. It is thus desirable to base a segmentation of a representation of the anatomical structure in two images of different imaging modality on the advantageous properties of both imaging modalities.

A problem to be solved by the present invention therefore is to provide a method of reliably segmenting image features representing an anatomical structure in a medical image which was generated with a second imaging modality based on a segmentation result received for a medical image generated in a first imaging modality, in particular a problem to be solved is to improve the information content of the segmentation result for the second imaging modality.

This problem is solved by the subject-matter of any appended independent claim. Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature. A feature of one embodiment which adds an additional function to another embodiment can in particular be added to said other embodiment.

EXEMPLARY SHORT DESCRIPTION OF THE INVENTION

In the following, the invention is described by way of a short example. This example shall not be construed to limit the invention to those features which are described in this section. Rather, this section merely offers as concise description of specific features of the present invention.

In order to solve the aforementioned problem, the inventive method in particular acquires a first modality medical image which has been generated with a first imaging modality and a second modality medical image which has been generated with the second image modality. A positional relationship between the first modality image and the second modality image is determined for example by fusing the two images. Furthermore, colour value data describing colour values appearing in the first modality medical image and the second modality medical image are determined and acquired by the inventive method. A segmentation algorithm is then applied to the first modality medical image in order to segment a first modality image representation of the anatomical structure. Then, a result of segmenting a second modality image representation of the anatomical structure from the second modality medical image is determined (preferably automatically) based on the knowledge about the positional relationship between the first medical image and the second medical image, the position of the first modality image representation in the first medical image and the colour values in both images. In particular, the second modality image representation is segmented from the second modality medical image by determining regions in the second modality medical image which have a correlation of colour values which is similar to the correlation of colour values in regions of the second medical image which are known to describe the anatomical structure, for example on the basis of information about the positional relationship between the two medical images and therefore for example in particular on the basis of the first modality medical image.

GENERAL DESCRIPTION OF THE INVENTION

The disclosed method is in particular a data processing method (more particularly, a medical data processing method, i.e. a data processing method which is suitable to process medical data, in particular medical image data) which is constituted to be executed by a computer and comprises the following preferable features.

Preferably, the inventive method is suitable for segmenting image features and medical images which were generated with different imaging modalities, wherein the image features represent a corresponding anatomical structure (in particular the same anatomical structure of the same patient's body) in each of the medical images. The anatomical structure can be any anatomical structure which is present in a (human) patient's body. For example, the anatomical structure can comprise at least one of soft tissue and hard tissue. Soft tissue can be represented by for example an internal organ such as the lung or the stomach, or part of the brain. Hard tissue can be represented by part of for example a bone or cartilage.

Preferably, first modality medical image data is acquired which describes a first medical image containing a first modality image representation of the anatomical structure. In particular, the first modality medical image data was generated by applying a first imaging modality to the anatomical structure. The representation of the anatomical structure in the resulting medical image is therefore termed first modality image representation. The term of representation (also called image representation) in the context of this disclosure refers in particular to the visual appearance of image elements (in particular pixels or voxels) features representing the anatomical structure in the medical image. The representation is defined for example by the colour values (in particular grey scale values) assigned to those image elements, and further particularly by the geometry (in particular at least one of shape and size) of the image of the anatomical structure.

Preferably, second modality medical image data is acquired which describes a second medical image containing a second modality image representation of the anatomical structure, i.e. a representation of the anatomical structure in the second imaging modality. The second modality medical image data was generated by applying a second imaging modality to the anatomical structure which preferably differs from (i.e. is not the same as) the first imaging modality. In particular, the first imaging modality and the second imaging modality are different imaging modalities which are selected from computed tomography imaging, x-ray imaging, magnetic resonance imaging, ultrasound imaging, and positron emission tomography imaging. In particular, the first imaging modality and the second imaging modality are at least two, in particular exactly two, (different ones) of those imaging modalities.

Preferably, modality transformation data describing a mapping transformation between the image information in the first modality image data and the second modality image data is determined based on the first modality medical image data and the second modality medical image data. The mapping transformation is in particular a linear mapping between the first modality medical image and the second modality medical image which can be embodied by a mapping matrix. The mapping transformation describes in particular a relation between the positional information defining the first modality medical image and the positional information defining the second modality medical image. Therefore, the mapping transformation allows comparing positional information contained in the first modality medical image data to positional information contained in the second modality medical image data. Determining the modality transformation data preferably comprises fusing the first modality medical image data and the second modality image data, for example by applying a rigid fusion algorithm to the two data sets. In that case, the mapping transformation is in particular a fusion transformation, preferably a rigid fusion transformation (i.e. a fusion transformation which does not deform the geometries of image features and is in particular limited to translations and rotations).

Preferably, colour value data is acquired which describes in particular a colour value of the image elements of the first modality medical image and the second modality medical image. The image elements are for example pixels or voxels, and the colour values preferably are greyscale values, however they can also be polychrome colour values. Preferably, the colour values data comprises colour value sets, for example arrays such as vectors, of colour values for each one of the image elements in the first modality image representation and the second modality image representation. Each one of the colour value sets then comprises information describing a colour value of an image element in the first modality image representation and information describing a colour value of the corresponding image element in the second modality image representation. The correspondence between the image elements in the first modality image representation and the second modality image representation is established in particular based on the information about the mapping transformation contained in the modality transformation data (i.e. based on in particular a positional mapping between the representations). In particular, the image elements are related to each other by the mapping transformation, i.e. they are mapped onto one another by the mapping transformation. The disclosed method can be applied to segmenting image features in medical images generated with $n=2, \ldots, N$ (where n and N are integer numbers and $N \geq 2$) different imaging modalities. For example, the colour value sets take the form of vectors, wherein each vector comprises n entries (preferably, $n=2$ and the vectors have a length of 2), each one entry for the colour value of the image element in each one of the n-th modality image representation. In the preferred case of $n=2$, one of the entries is the colour value of the image element in the first modality image representation, and the other one of the two entries is the colour value of the corresponding image element in the second modality image representation. Therefore, each member of the colour value sets describes the colour value of one of the image elements in either the first modality image representation or the second modality image representation.

Preferably, the first modality segmentation data is determined based on the first modality medical image data. The first modality segmentation data describes in particular an image segmentation (more particularly, the result of segmenting specific image features) of the first modality representation from the first modality medical image. In particular, the first modality image representation is segmented from the first modality medical image. The first modality segmentation data therefore describes in particular the first modality image representation. The image segmentation is preferably carried out by applying a known segmentation algorithm such as edge detection or region growing to the first modality medical image data. The result of segmenting the first medical image comprises in particular information about which image elements describe the anatomical structure in the first modality medical image data. On this basis, in particular the associated colour value set comprising information about the colour value of the image elements is preferably determined.

Preferably, second modality segmentation data is determined based on the first modality segmentation data and the modality transformation data and the colour value data. The second modality data segmentation describes in particular the result of segmenting the second modality image representation from the second modality medical image. In particular, the second modality segmentation data describes the second modality image representation. In particular, the second modality image representation is segmented from the second modality medical image data, and the result of that segmentation is described by the second modality segmentation data. Preferably, determining the second modality segmentation data comprises correlating the colour value sets contained in the colour value data. For example, such a correlation comprises applying a cross-correlation function to the colour value sets in order to determine regions in the second medical image which have a correlation of colour values (in particular of neighbouring image elements) which is (in particular within a predetermined threshold) similar to the correlation of colour values of the image elements in the second modality image representation which correspond to image elements in the first modality image representation on the mapping transformation. It is assumed that, even if for example the second imaging modality is not suitable to image the anatomical structure, the correlation of colour values in those regions in the second modality medical image is similar to the correlation of colour values at the positions of the second modality image representation which are known to represent a part of the anatomical structure on the basis of the positional correspondence described by the mapping transformation. In particular, the correlation is determined between the entries of the colour value sets for the same modality image representation, i.e. entries describing colour values of image elements of the second modality image representation are correlated with other entries describing colour values of image elements in the second modality representation. In particular, the position of the first modality image representation in the first modality medical image described by the first modality medical image data is known from the step of determining the first modality segmentation data, and the position of the second modality representation in the second modality medical image described by the second modality medical image data is known at least on the basis of the modality transformation data. Thus, the feature of correlating the colour value sets allows to determine whether, in the second modality medical image data, there are image elements outside of the set of positions defined by applying the mapping transformation to the first modality image representation, which fulfils a predetermined criterion with regard to the result of correlating the known image elements of the second modality image representation. This allows including image elements in the second modality medical image into the second modality image representation of the anatomical structure which, on the basis of the mapping transformation alone, would not be included in the second modality image representation. Thereby, the method accounts for the specific imaging characteristics of the second imaging modality with regard to the anatomical structure and includes the benefits of the first imaging modality. Alternatively to correlating the colour value sets, a distance may be determined between the colour values in a predetermined colour space. The distance is calculated in particular between the entries of the colour value sets describing the image elements of the second modality medical image. The second modality image representation is then determined as the set of image elements of the second modality medical image have a distance (in particular predetermined distance) from the colour values of the image elements in the second modality medical image which are associated with the first modality image representation via the mapping transformation. The distance may be determined for example as a norm (for example an $L_2$ norm) in the colour space used to describe the second modality medical image.

Preferably, the first modality segmentation data is determined based on acquiring first modality image region selection data describing a selection of an image region in a first modality medical image to be segmented. The selection is for example a user-initiated selection, which a user can perform for example by defining the image region with manual input using for example input device such as a mouse or a keyboard. For example, the user marks an image region by selecting image elements in the first modality medical image using a mouse which shall serve as a basis for carrying out the segmentation, and the first modality image representation is then determined (by way of segmenting the selected image region of the first modality medical image) to comprise (in particular consists of) all image elements of the first modality medical image which have the same colour value correlation as those which have been selected. The correlation between colour values is determined preferably by cross-correlating the colour values of the image elements of the first modality medical image which are described by the colour value data, in particular the colour value sets. The correlation can be determined by applying a cross-correlation function to the corresponding entries in the colour value sets or determining a distance such as a norm, between the colour values in a predetermined colour space in analogy to the above-described manner in which the second modality segmentation data is determined.

Preferably, the second modality segmentation data is determined (as described above) based on correlating the colour values of the image elements of the second modality medical image with the colour values of the image elements of the second modality medical image which are associated with (i.e. correspond to) the image elements of the first modality medical image which represent the first modality image representation, wherein the association is defined in particular by the mapping transformation. Alternatively, the set of image elements of the second medical image which are to be associated with the first modality image representation can be defined by user interaction. For example, the second modality segmentation data is determined based on acquiring second modality image region selection data describing a selection (a user-initiated selection) of an image region in the second modality medical image which is to be segmented. This selection can be performed similar to, in particular in the same manner as, the selection of the image region in the first modality medical image to be segmented. For example, information about the corresponding image elements can be displayed to a user (e.g. by graphical highlighting in the second modality medical image) and the user can then select on the basis of which of the corresponding image elements in the second modality medical image the second modality image representation shall be segmented.

Preferably, the first modality image representation and the second modality image representation are two-dimensional representations. Further preferably, the first modality image representation comprises a plurality of two-dimensional first modality image representations each describing an image representation of an anatomical structure, and the second modality image representation comprises a plurality of two-dimensional second modality image representations each describing an image representation of the anatomical structure. In particular, the first modality medical image data comprises a plurality of two-dimensional slice images each describing an image representation of an anatomical structure. Segmentation of the first modality image representation is then preferably conducted automatically in all of the plurality of two-dimensional second modality image representations (in particular in all of the slice images) based on the segmentation result received for one of the two-dimensional second modality representations for which e.g. a user inputs information describing an image region to be segmented from that two-dimensional second modality representation (this image region being described in particular by first modality image region selection data).

Likewise, the second modality medical image data in particular comprises a plurality of two-dimensional slice images each describing an image representation of an anatomical structure. According to a preferred embodiment, the two-dimensional second modality image representation and the two-dimensional first modality image representations represent different perspectives relative to the position of the anatomical structure in which the respective medical image data was acquired. This allows to determine in particular a three-dimensional first modality image representation from the plurality of first modality image representations and a three-dimensional second modality image representation from the plurality of second modality image representations. This is preferably done by correlating the colour values of the image elements, separately in each of the imaging modalities, of the two-dimensional first and second modality image representations, respectively, in order to determine a segmented structure in three-dimensions on the basis of the segmentation result in two dimensions. The correlation between the two-dimensional image representations can be implemented in both imaging modalities as described above by for example applying a cross-correlation function or determining a distance between the colour values. The modality transformation data then preferably describes a mapping transformation between the three-dimensional first modality image representation and the three-dimensional second modality image representation in order to determine second modality segmentation data which describes a segmentation result of segmenting the second modality representation from the second modality medical image data in three dimensions. In particular, the second modality representation then is the result of a three-dimensional image segmentation.

Preferably, the three-dimensional first modality image representation and the three-dimensional second modality image representation are determined alternatively or additionally to the above based on interpolating the colour values between the two-dimensional first modality representations and the two-dimensional second modality representations, respectively, separately for each imaging modality. Thereby, continuous image representations can be generated in which the empty spaces between the positions of each two-dimensional image representation (in particular between slice images, which may be due to the imaging and movement speeds of e.g. a CT and/or MR gantry) can be filled by image elements having a correspondingly interpolated colour value.

Preferably, the first modality medical image data comprises first modality local change data which describes a change to the first modality image representation. Such a change has been performed for example based on user input and may comprise (in particular consist of and/or be) an addition or excision to or from, respectively, the first modality image representation. The change can be performed for example by user interaction, in particular the user may utilize an input device such as a mouse or a keyboard to add or excise a graphical feature from the first modality image representation. Acquisition of such first modality local change data may be applicable in cases in which automatic segmentation of the first modality image representation has at least partly failed, for example the user may manually correct such a failure (i.e. change a part of the first modality image representation which he thinks was not properly segmented). The changed first modality image representation which results from applying the change to the first modality image representation is preferably determined by adapting the representation area which defines the changed part of the first modality image representation to a remaining region of the first modality image representation. In particular, the boundary of the changed part is adapted to the neighbouring boundary of the remaining region of the first modality image representation (i.e. the region of the first modality image representation which remains unchanged). The adaptation is performed preferably based on the colour value data, for example by colour value interpolation (in particular three dimensional colour interpolation, i.e. colour value interpolation in three dimensions). Preferably, the second modality image representation is then adapted to the changed first modality image representation based on the modality transformation data (in particular based on the mapping transformation). In particular, the second modality image representation is changed such that it resembles the change to the first modality image representation.

The invention also relates to a program which, when running on a computer or when loaded onto a computer, causes the computer to perform one or more or all of the method steps described herein and/or to a program storage medium on which the program is stored (in particular in a non-transitory form) and/or to a computer on which the program is running or into the memory of which the program is loaded and/or to a signal wave, in particular a digital signal wave, carrying information which represents the program, in particular the aforementioned program, which in particular comprises code means which are adapted to perform any or all of the method steps described herein.

DEFINITIONS

In this section, definitions for specific terminology used in this disclosure are offered which also form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements, and optionally a volatile memory (in particular a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). A computer herein is a technical computer which comprises in particular technical, in particular tangible components, in particular mechanical and/or electronic components. Any device mentioned herein is a technical, in particular tangible device.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (so-called medical imaging modalities and/or radiological imaging methods) such as for instance computed tomography (CT) and cone beam computed tomography (CBCT, in particular volumetric CBCT), x-ray tomography, magnetic resonance tomography (MRT or MRI), conventional x-ray, sonography and/or ultrasound examinations, and positron emission tomography. Analytical devices in particular are used to generate the image data in apparatus-based imaging methods. The imaging methods are in particular used for medical diagnostics, to analyse the anatomical body in order to generate images which are described by the image data. The imaging methods are also in particular used to detect pathological changes in the human body. However, some of the changes in the anatomical structure, in particular the pathological changes in the structures (tissue), may not be detectable and in particular may not be visible in the images generated by the imaging methods. A tumour represents an example of a change in an anatomical structure. If the tumour grows, it may then be said to represent an expanded anatomical structure. This expanded anatomical structure may not be detectable; in particular, only a part of the expanded anatomical structure may be detectable. Primary/high-grade brain tumours are for example usually visible on MRI scans when contrast agents are used to infiltrate the tumour. MRI scans represent an example of an imaging method. Imaging methods are in the framework of this disclosure also called medical imaging methods, imaging modalities and/or medical imaging modalities.

The method in accordance with the invention is in particular a data processing method. The data processing method is preferably performed using technical means, in particular a computer. The data processing method is preferably constituted to be executed by or on a computer, in particular it is executed by or on the computer. I particular, all the steps or merely some of the steps (i.e. less than the total number of steps) of the method in accordance with the invention can be executed by a computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. In particular, the term "cloud" is used in this respect as a metaphor for the Internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer. The computer is preferably operatively coupled to a display device which allows to display information outputted by the computer e.g. to a user. An example of a display device is an augmented reality device (also called augmented reality glasses) which may be used as goggles for navigating. A specific example of such augmented reality glasses is Google Glass (trademark of Google Inc.). An augmented reality device may be used to both input information into the computer by user interaction and to display information outputted by that computer.

The expression "acquiring data" in particular encompasses (within the framework of a data processing method) the scenario in which the data are determined by the data processing method or program. Determining data in particular encompasses measuring physical quantities and transforming the measured values into data, in particular digital data, and/or computing the data by means of a computer and in particular within the framework of the method in accordance with the invention. The meaning of "acquiring data" also in particular encompasses the scenario in which the data are received or retrieved by the data processing method or program, for example from another program, a previous method step or a data storage medium, in particular for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are in particular detected or captured (for example by an analytical device). Alternatively or additionally, the data are inputted in accordance with the additional step, for instance via interfaces. The data generated can in particular be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, in particular determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

Image fusion can be elastic image fusion or rigid image fusion. In the present invention, it is preferred that image fusion is conducted by applying rigid fusion. In case of rigid image fusion the relative position between the pixels or voxels of an image (2D or 3D) is fixed while in case elastic image fusion, the relative positions are allowed to change.

In this application, the term "image morphing" is also used as an alternative to the term "elastic image fusion", but with the same meaning.

Elastic fusion transformations (for example, elastic image fusion transformations) are in particular designed to enable a seamless transition from one data set (for example a first data set such as for example a first image) to another data set (for example a second data set such as for example a second image). The transformation is in particular designed such that one of the first and second data sets (images) is deformed, in particular in such a way that corresponding structures (in particular, corresponding image elements) are arranged at the same position as in the other of the first and second images. The deformed (transformed) image which is transformed from one of the first and second images is in particular as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are in particular vectors of a deformation field. These vectors are determined by the optimisation algorithm which results in an optimum degree of similarity. Thus, the optimum degree of similarity represents a condition, in particular a constraint, for the optimisation algorithm. The bases of the vectors lie in particular at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), in particular in order to avoid pathological deformations (for instance, all the voxels being shifted to the same position by the transformation). These constraints include in particular the constraint that the transformation is regular, which in particular means that a Jacobian determinant calculated from a matrix of the deformation field (in particular, the vector field) is larger than zero, and the constraint that the transformed (deformed) image is not self-intersecting and in particular that the transformed (deformed) image does not comprise faults and/or ruptures. The constraints include in particular the constraint that if a regular grid is transformed simultaneously with the image and in a corresponding manner, the grid is not allowed to interfold at any of its locations. The optimising problem is in particular solved iteratively, in particular by means of an optimisation algorithm which is in particular a first-order optimisation algorithm, in particular a gradient descent algorithm. Other examples of optimisation algorithms include optimisation algorithms which do not use derivations such as the downhill simplex algorithm or algorithms which use higher-order derivatives such as Newton-like algorithms. The optimisation algorithm preferably performs a local optimisation. If there are a plurality of local optima, global algorithms such as simulated annealing or generic algorithms can be used. In the case of linear optimisation problems, the simplex method can for instance be used.

In the steps of the optimisation algorithms, the voxels are in particular shifted by a magnitude in a direction such that the degree of similarity is increased. This magnitude is preferably less than a predefined limit, for instance less than $\frac{1}{10}$ or $\frac{1}{100}$ or $\frac{1}{1000}$ of the diameter of the image, and in particular about equal to or less than the distance between neighbouring voxels. Large deformations can be implemented, in particular due to a high number of (iteration) steps.

The determined elastic fusion transformation can in particular be used to determine a degree of similarity (or similarity measure, see above) between the first and second data sets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can in particular be determined on the basis of a determined correlation between the first and second data sets.

DESCRIPTION OF THE FIGURES

In the following, an example embodiment will be described by reference to the Figures, wherein the invention shall not be limited to the features described in connection with the Figures, and wherein

In FIG. 1, an illustration is given of segmentation results A, B and C achieved when segmenting a first modality image representation from medical images taken with imaging modality A, B or C, respectively. The shaded areas in the upper series of illustrations denote an area in the respective medical image for which the certainty of successful segmentation of a first modality image representation representing a specific anatomical structure is high. The dashed contours around the shaded areas denote the outer boundaries of areas where the corresponding certainty is low, due to for example a low contrast of the corresponding image features. In order to achieve a more reliable segmentation result, the segmentation results A, B and C obtained for each one of the medical images are combined to obtain a multi-modal result. In particular, the segmentation results B and C are obtained by automatic segmentation of image regions in the medical images taken with imaging modalities B and C which are associated (in particular by image fusion of the three medical images taken with imaging modalities A, B and C) with the positions of the image region which is (in particular manually) segmented in the image taken with imaging modality A. This multi-modal result has a higher probability of showing a true image representation of the anatomical structure. Such an overlay essentially is the result of applying the inventive method.

FIGS. 2(a) to 2(c) show method steps relating to acquiring first modality image region selection data. According to FIG. 2(a), a mouse cursor is drawn in a manual stroke along the trajectory shown by the black line in the drawing direction indicated by the arrow head. The first modality image region selection data then is determined such that it indicates that the image region to be segmented extends to a distance around the stroke trajectory and in particular forms an image region around the stroke trajectory. the image region being indicated by the solid tender line in FIG. 2(a) to (c). The extent of that image region is determined based on determining a correlation of colour values of the image elements marked (in particular traversed) by the stroke trajectory and determining image elements in the vicinity of the stroke trajectory which have a similar correlation of colour values. Those image elements are then included in the image region to be segmented. FIG. 2(b) illustrates the possibility of decreasing the image region to be segmented by reversing the stroke, FIG. 2(c) shows how to, for example subsequently, extend the image region to be segmented in a different direction by drawing the manual stroke forward again in a different direction, but again away from the initial starting point.

FIG. 3(a) to (c) illustrate the principle of determining a changed first modality image representation. In FIG. 3(a), a local modification representing a change to the first modality image representation is indicated in black shading, whereas an existing object representing the remaining region of the first modality region of the first modality image representing is indicated by the tender black line. FIG. 3(b) shows a possible bounding box indicated by a dashed boundary which defines an area in which the representation are defining a change is adapted to the existing object for example by colour value interpolation. FIG. 3(c) shows the adapted change and the resulting changed first modality image representation.

Figure 1:
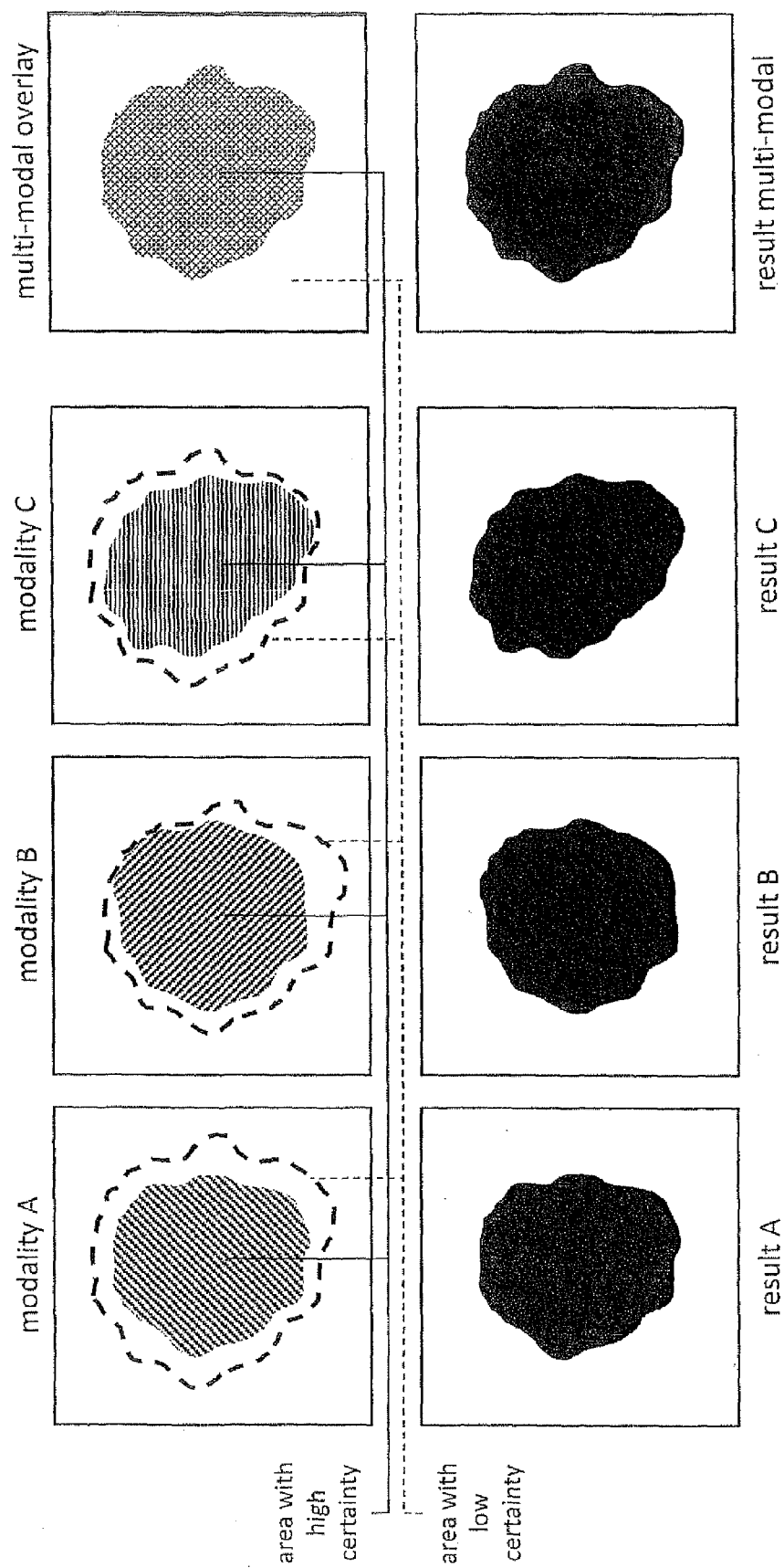
FIG. 1 shows possible problems associated with segmenting a specific image feature in dependence on the used imaging modality.
Figure 2:
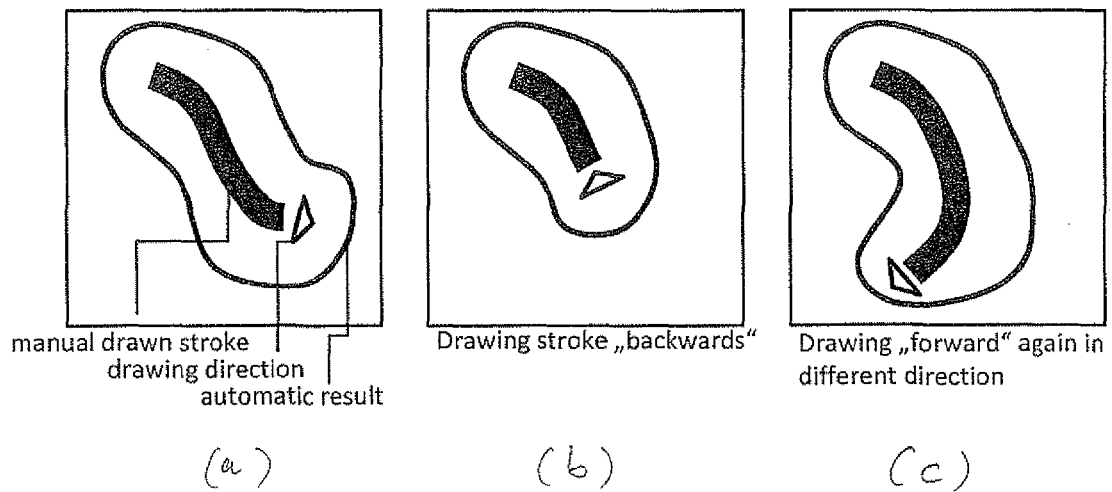
FIG. 2 shows the principles of inputting image region selection data.
Figure 3:
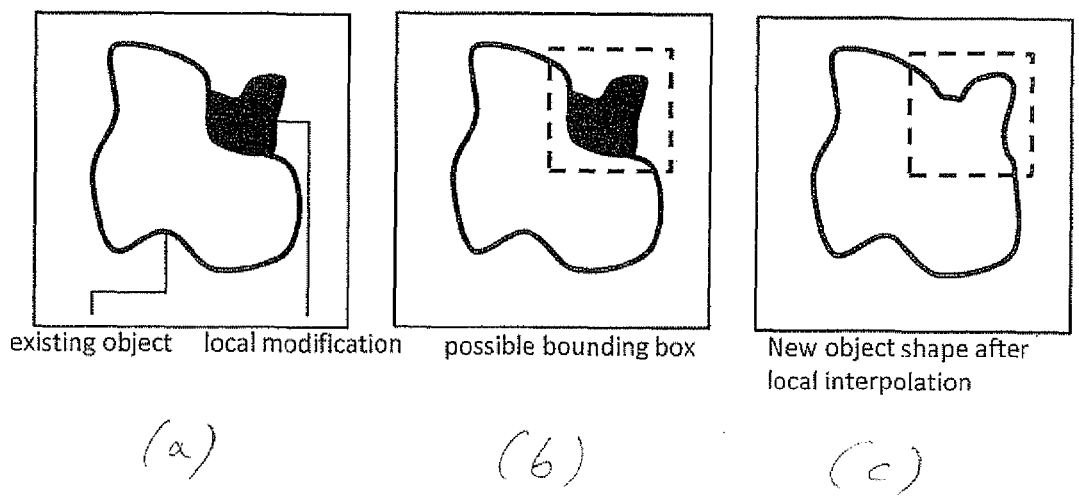
FIG. 3 shows the principle of determining a changed first modality image representation.
Figure 4:
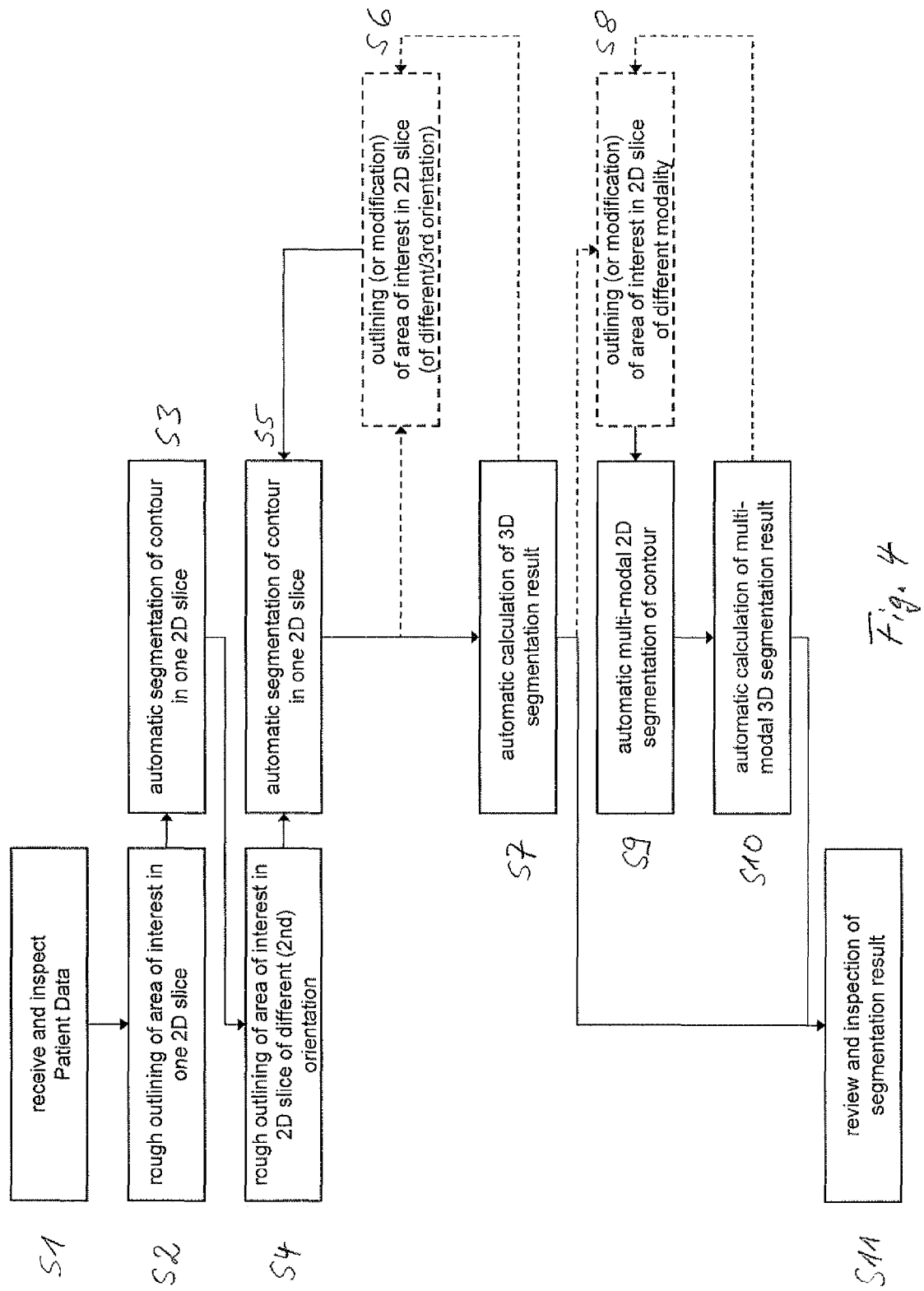
FIG. 4 shows a flow diagram which implements an embodiment of the inventive method.

According to the flow diagram of an example embodiment of the present invention shown in FIG. 4, the method starts with step S1 in which patient data representing the first modality medical image data is received and inspected by a user. The method continuous with step S2 in which a user performs a selection for generation of the first modality image region selection data by rough outlining of an area of interest in one-two dimensional slice image (corresponding to the first modality medical image) of the first modality medical image data in particular in the manner shown in FIG. 2. This results in an automatic segmentation of an image region limited by an outer contour in the two-dimensional slice image in step S3. The procedure of step S2 is then repeated in step S4 for a second two-dimensional slice image having an orientation, (i.e. perspective relative to the anatomical structure of interest) which is different from the two-dimensional slice image assessed in step S2. In step S5 the automatic segmentation described in step S3 is then repeated in the second two-dimensional slice image. As is indicated in optional step S6 which includes acquiring manual input for regarding an image region to be segmented, step S5 may be repeated for the same slice image (for example, to manually correct the segmentation result obtained for that slice) or a third (and further) two-dimensional slice images of in particular each a different orientation (i.e. perspective relative to the anatomical structure). As often as optional step S6 is repeated (in particular at the choice of a user), step S5 is re-entered automatically. Step S7 carries on with determining, from the segmentation results received by segmenting the individual two-dimensional slice images, a three-dimensional representation results which represents a three-dimensional first modality image representation.

The method then proceeds to step S8 or directly to step S11. Step S8 is directed to acquiring second modality image region selection data by user-initiated manual outlining of an area of interest in a two-dimensional slice image of a different modality, i.e. in the second modality medical image.

Subsequent step S9 represents the steps of determining the second modality segmentation data which includes an automatic multi-modal two-dimensional segmentation of a contour delineating the second modality image representation from the second modality medical image. Based on in particular correlating the colour values in the two-dimensional slice images in the second modality medical image data, an automatic calculation of a multi-modal three-dimensional segmentation result can be determined in step S10 which corresponds to a three-dimensional second modality image representation. The user may choose to repeat step S8, for example to correct the three-dimensional segmentation result by inputting further information regarding the image region to be segmented in the same or another two-dimensional image slice of the second imaging modality. As often as step S8 is thus repeated, step S9 and subsequent step S10 are then automatically re-entered.

The method then ends with step S11 which includes displaying the segmentation result in the second imaging modality (if steps S8 to S10 are executed), and preferably a review and inspection of the segmentation result in two or three dimensions, depending on whether steps S8 to S10 are executed or whether the method proceeds directly to step S11 from step S7, the review and inspection being carried out for example by a user.

The invention claimed is:

1. A system for segmenting image features in medical images generated with different imaging modalities, wherein the image features represent a corresponding anatomical structure, the system comprising a computer which is configured to execute a program which, when executed on the computer, causes a processor of the computer to execute a computer-implemented method, the method comprising:
- a) acquiring, at the processor, first modality medical image data describing a first modality medical image containing a first modality image representation of the anatomical structure;
- b) acquiring, at the processor, second modality medical image data describing a second modality medical image containing a second modality image representation of the anatomical structure;
- c) determining, by the processor and based on the first modality medical image data and the second modality medical image data, modality transformation data describing a mapping transformation between the image information in the first modality image data and the image information in the second modality image data;
- d) acquiring, at the processor, colour value data describing a colour value of the image elements in the first modality medical image and in the second modality medical image, wherein the colour value data comprises colour value sets of colour values for each one of the image elements in the first modality image representation and the second modality image representation, wherein each member of a set describes the colour value of one of the image elements in either the first modality image representation or the second modality image representation;
- e) determining, by the processor and based on the first modality medical image data, first modality segmentation data describing the result of segmenting the first modality image representation from the first modality medical image data;
- f) determining, by the processor and based on the first modality segmentation data and the modality transformation data and the colour value data, second modality segmentation data describing a result of segmenting the second modality image representation from the second modality medical image data,
- g) wherein determining the second modality segmentation data comprises correlating the colour value sets, wherein correlating the colour value sets comprises applying a cross-correlation function to the colour value sets or determining a distance between the colour values in a predetermined colour space, wherein
the first modality image representation comprises a plurality of two-dimensional first modality image representations each describing an image representation of the anatomical structure, and
the second modality image representation comprises a plurality of two-dimensional second modality image representations each describing an image representation of the anatomical structure, and
a three-dimensional first modality image representation is determined, by the processor, from the plurality of two-dimensional first modality image representations and a three-dimensional second modality image representation is determined from the plurality of two-dimensional second modality image representations, and
the modality transformation data describes a mapping transformation between the three-dimensional first modality image representation and the three-dimensional second modality image representation.

2. A computer-implemented method of segmenting image features in medical images generated with different imaging modalities, wherein the image features represent a corresponding anatomical structure in each of the medical images, the method comprising executing, on a processor of a computer, steps of:
- a) acquiring, at the processor, first modality medical image data describing a first modality medical image containing a first modality image representation of the anatomical structure;
- b) acquiring, at the processor, second modality medical image data describing a second modality medical image containing a second modality image representation of the anatomical structure;
- c) determining, by the processor and based on the first modality medical image data and the second modality medical image data, modality transformation data describing a mapping transformation between the image information in the first modality image data and the image information in the second modality image data;
- d) acquiring, at the processor, colour value data describing a colour value of the image elements in the first modality medical image and in the second modality medical image, wherein the colour value data comprises colour value sets for each one of the image elements in the first modality image representation and the second modality image representation, wherein each member of a set describes the colour value of one of the image elements in either the first modality image representation or the second modality image representation;
- e) determining, by the processor and based on the first modality medical image data, first modality segmentation data describing the result of segmenting the first modality image representation from the first modality medical image data;
- f) determining, at the processor and based on the first modality segmentation data and the modality transformation data and the colour value data, second modality segmentation data describing a result of segmenting the second modality image representation from the second modality medical image data,
- g) wherein determining the second modality segmentation data comprises correlating the colour value sets,
  wherein correlating the colour value sets comprises applying a cross-correlation function to the colour value sets or determining a distance between the colour values in a predetermined colour space, wherein
the first modality image representation comprises a plurality of two-dimensional first modality image representations each describing an image representation of the anatomical structure, and
the second modality image representation comprises a plurality of two-dimensional second modality image representations each describing an image representation of the anatomical structure, and
a three-dimensional first modality image representation is determined, by the processor, from the plurality of two-dimensional first modality image representations and a three-dimensional second modality image representation is determined from the plurality of two-dimensional second modality image representations, and
the modality transformation data describes a mapping transformation between the three-dimensional first modality image representation and the three-dimensional second modality image representation.

3. The method according to claim 2, wherein the two-dimensional second modality image representations represent the same perspective or different perspectives relative to the position of the anatomical structure.

4. The method according to claim 3, wherein the three-dimensional first modality image representation and the three-dimensional second modality image representation are determined based on interpolating the colour values between the two-dimensional first modality representations and the two-dimensional second modality representations, respectively.

5. The method according to claim 2, wherein determining the modality transformation data comprises fusing the first modality medical image data and the second modality image data by applying a rigid fusion algorithm.

6. The method according to claim 2, wherein the first modality segmentation data is determined, by the processor, based on acquiring first modality image region selection data describing a selection of an image region in the first modality medical image to be segmented.

7. The method according to claim 2, wherein the second modality segmentation data is determined, by the processor, based on acquiring second modality image region selection data describing a user-initiated selection of an image region in the second modality medical image to be segmented.

8. The method according to claim 2,
wherein the first modality medical image data comprises first modality local change data describing a change to the first modality image representation which has been performed based on user input,
wherein a changed first modality image representation is determined, by the processor, by adapting the representation area defining the changed part of the first modality image representation based on the colour value data to a predetermined remaining region of the first modality image representation by three-dimensional colour value interpolation, and
wherein the second modality image representation is adapted to the changed first modality image representation based on the modality transformation data.

9. The method according to claim 8, wherein the change is an addition or excision to or from, respectively, the first modality image representation.

10. The method according to claim 2, wherein the colour value data describes greyscale colour values.

11. The method according to claim 2, wherein the first imaging modality and the second imaging modality are different imaging modalities and comprise at least two of computed tomography imaging, x-ray imaging, magnetic resonance imaging, ultrasound imaging, and positron emission tomography imaging.

12. A non-transitory computer-readable program storage medium on which a program is stored which, when running on a computer or when loaded onto a computer, causes the computer to perform, a computer-implemented method of segmenting image features in medical images generated with different imaging modalities, wherein the image features represent a corresponding anatomical structure in each of the medical images, the method comprising executing, on a processor of the computer, steps of:

a) acquiring, at the processor, first modality medical image data describing a first modality medical image containing a first modality image representation of the anatomical structure;
b) acquiring, at the processor, second modality medical image data describing a second modality medical image containing a second modality image representation of the anatomical structure;
c) determining, by the processor and based on the first modality medical image data and the second modality medical image data, modality transformation data describing a mapping transformation between the image information in the first modality image data and the image information in the second modality image data;
d) acquiring, at the processor, colour value data describing a colour value of the image elements in the first modality medical image and in the second modality medical image, wherein the colour value data comprises colour value sets of colour values for each one of the image elements in the first modality image representation and the second modality image representation, wherein each member of a set describes the colour value of one of the image elements in either the first modality image representation or the second modality image representation;
e) determining, by the processor and based on the first modality medical image data, first modality segmentation data describing the result of segmenting the first modality image representation from the first modality medical image data;
f) determining, by the processor and based on the first modality segmentation data and the modality transformation data and the colour value data, second modality segmentation data describing a result of segmenting the second modality image representation from the second modality medical image data,
g) wherein determining the second modality segmentation data comprises correlating the colour value sets, wherein correlating the colour value sets comprises applying a cross-correlation function to the colour value sets or determining a distance between the colour values in a predetermined colour space,
wherein
the first modality image representation comprises a plurality of two-dimensional first modality image representations each describing an image representation of the anatomical structure, and
the second modality image representation comprises a plurality of two-dimensional second modality image representations each describing an image representation of the anatomical structure, and
a three-dimensional first modality image representation is determined, by the processor, from the plurality of two-dimensional first modality image representations and a three-dimensional second modality image representation is determined from the plurality of two-dimensional second modality image representations, and
the modality transformation data describes a mapping transformation between the three-dimensional first modality image representation and the three-dimensional second modality image representation.

* * * * *

UNITED STATES PATENT AND TRADEMARK OFFICE
CERTIFICATE OF CORRECTION

PATENT NO. : 9,697,600 B2
APPLICATION NO. : 14/901289
DATED : July 4, 2017
INVENTOR(S) : Jens Keuchel et al.

It is certified that error appears in the above-identified patent and that said Letters Patent is hereby corrected as shown below:

On the Title Page

Please replace:
"(54) MULTI-MODAL SEGMENTATIN OF IMAGE DATA"

With the following:
--(54) MULTI-MODAL SEGMENTATION OF IMAGE DATA--

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*